Figure 1:
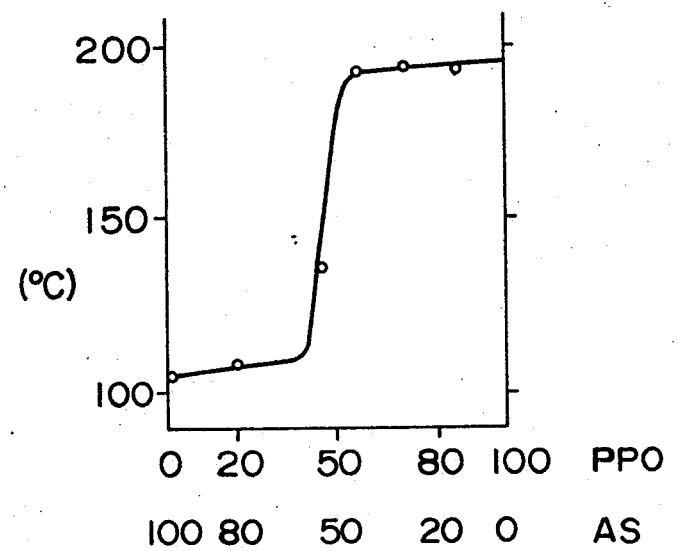

United States Patent [19]
Nakanishi et al.

[11] 3,708,455
[45] Jan. 2, 1973

[54] REINFORCED POLYPHENYLENE ETHER COMPOSITIONS

[75] Inventors: Atsuo Nakanishi, Kanagawa; Shinichi Izawa, Kunio Toyama, Kanagawa, all of Japan

[73] Assignee: Asahi-Dow Limited, Tokyo, Japan

[22] Filed: June 29, 1971

[21] Appl. No.: 157,856

[52] U.S. Cl. .............................260/37 R, 260/41 AG
[51] Int. Cl. ...............................................C08g 51/10
[58] Field of Search.260/37 R, 892, 893, 901, 37 AL

[56] References Cited

UNITED STATES PATENTS

| | | | |
|---|---|---|---|
| 3,471,587 | 10/1969 | Whittemore et al. | 260/37 R X |
| 3,639,331 | 2/1972 | Hattori et al. | 260/37 R X |
| 3,383,435 | 5/1968 | Cizek | 260/874 |
| 3,660,531 | 5/1972 | Lauchlan et al. | 260/892 X |
| 3,370,107 | 2/1968 | Barth | 260/901 |
| 3,221,080 | 11/1965 | Fox | 260/37 R X |

*Primary Examiner*—Lewis T. Jacobs
*Attorney*—Cushman, Darby & Cushman

[57] ABSTRACT

Polyphenylene ether compositions reinforced with glass fiber, are excellent in shaping processability. They are prepared by blending from 10 to 50 percent by weight of glass fiber and from 90 to 50 percent by weight of a basic resin composition, said basic resin composition consisting of from 95 to 50 percent by weight based on the basic composition of polyphenylene ether and from 5 to 50 percent by weight of based on the basic composition of amorphous polymer, e.g. styrene-acrylonitrile polymer. A 1 : 1 mixture of polyphenylene ether with polystyrene, for example, may be used in place of the polyphenylene ether.

15 Claims, 6 Drawing Figures

REINFORCED POLYPHENYLENE ETHER COMPOSITIONS

The present invention relates to a composition of a polyphenylene ether resin reinforced with glass fiber. More particularly, the invention relates to a new resin composition which has an improved shaping processability retaining he excellent properties of the polyphenylene ether. The composition is obtained by mixing glass fiber with a resinous composition comprising a polyphenylene ether resin composition and an amorphous polymer.

Polyphenylene ether resins are known as engineering plastics having excellent thermal, mechanical and electrical properties. Resin mixtures of the polyphenylene ether resin and polystyrene have also been developed. These resin mixtures possess excellent thermal properties, because the glass transition temperature of polyphenylene ethers are extremely high as compared with that of conventional thermoplastic resins. The mechanical properties of these resin mixtures are stable within a wide range of temperature, and are particularly excellent with respect to the creep deformation. Although the polyphenylene ether resins with or without polystyrene possess high glass transition temperatures, they are inferior in shaping processability.

In order to improve the shaping processability, there have been proposals that a ternary copolymer of styrene, acrylonitrile and butadiene, a copolymer of styrene and acrylonitrile, or the like be mixed with the polyphenylene ether (U.S. Pat. No. 3,383,435, Japanese Pat. Publication No. 17,812/1968 and French Pat. No. 1,462,927). Further, U.S. Pat No. 3,221,080 and U.K. Pat. No. 1,026,148 suggest that an aromatic polycarbonate is blended with a polyphenylene ether. However, the high thermal deformation temperature, one of the favorite characters, is decreased in place of the increase of shaping processability. Furthermore, these mixings largely reduce the mechanical properties of polyphenylene ethers, particularly the Izod impact strength.

Another approach in order to improve the mechanical and thermal properties of thermoplastic resins is to mix a glass fiber thereto. Although the mixing promotes tensile strength, bending strength, thermal deformation temperature, thermal expansion coefficient, and so on, it greatly reduces impact strength as well as shaping processability (for example, Reinforced Plastics, Vol. 14, No. 6, page 36, and Metallic Materials, Vol. 9, No. 11, page 61).

The present inventors have discovered facts which cannot be expected from the prior art. That is, they have found out that, when a styrene-acrylonitrile resin, for example, is mixed with the polyphenylene ether (admixed with or without polystyrene) and further a glass fiber is blended therewith, the mechanical properties, particularly Izod impact strength, can largely be improved without lowering the favorable property of the polyphenylene ether, that is, the thermal deformation temperature. Furthermore, they have discovered that the same phenomenon can be exhibited when an amorphous polymer other than styrene-acrylonitrile resin is used.

An object of the present invention is to provide a polyphenylene ether composition with or without polystyrene, the composition being reinforced with glass fiber, wherein the advantages of the composition are retained and the Izod impact strength and the mechanical processability are improved. The resin composition of the present invention can satisfactorily be injection-shaped under almost the same conditions as those of the conventional thermoplastic resins. Furthermore, the present composition can easily be shaped into large shaped articles.

According to the present invention, a reinforced composition is provided which comprises (1) 90 to 50 percent by weight of a basic resin and 10 to 50 percent by weight of glass fiber. The basic resin consists of 50 to 95 percent by weight of polyphenylene ether or a resin mixture of the polyphenylene ether and polystyrene and 50 to 5 percent by weight of an amorphous polymer. Parts and percentages are hereinafter referred to by weight.

In the reinforced polyphenylene ether resin composition of the present invention, the amorphous polymer is dispersed as isolated granules in the polyphenylene ether phase or in the resin mixture phase of polyphenylene ether and polystyrene, just like islands scattered in the sea. The above-mentioned amorphous polymer is in the spherical form having from 0.1 to 10 micron, in average size.

The polyphenylene ether stands for aromatic polyethers having substituents at 2 and 6 positions, represented by the formula,

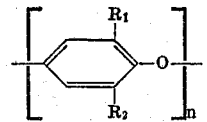

wherein $R_1$ and $R_2$ are the same or different monovalent substituents; $n$ represents the degree of polymerization, which is an integer of from 30 to 1,000; and the said substituents are an alkyl, aryl or alkoxy group or a halogen atom. The most preferable example is poly(2,6-dimethyl phenylene-1,4 ether).

The resin mixture comprising the polyphenylene ether and polystyrene in the present invention stands for the composition wherein the resins at the ratio of from 90:10 to 10:90 by weight are mixed with each other.

The above-mentioned polystyrene means homopolymers or copolymers of styrene having molecular weight of from 5000 to 500,000. In the copolymer, the styrene content is 90 percent or more. Comonomers for the copolymer include such copolymerizable unsaturated compounds as α-methylstyrene, chlorostyrene, methylstyrene, dimethylstyrene and dichlorostyrene; acrylic esters such as methyl acrylate, ethyl acrylate, methyl methacrylate, butyl methacrylate and the like; acrylonitrile, vinyl ethers, vinyl esters and so on.

The amorphous polymer stands for the resins which are incompatible with the polyphenylene ether admixed with or without polystyrene. Accordingly, the particles of the amorphous polymer remain in the final composition as isolated particles in the dispersed state. The mixture of polyphenylene ether (admixed with or without polystyrene) and the amorphous polymer possesses at least two glass transition temperatures. The concrete examples thereof are styrene-acrylonitrile copolymers, styreneemethyl methacrylate copolymers, polymethyl methacrylates, aromatic polycarbonates and the like.

The styrene-acrylonitrile copolymers are those comprising 10 to 90 percent of styrene and 90 to 10 percent of acrylonitrile, the molecular weight of which being from 2,000 to 200,000.

The styrene-methyl methacrylate copolymers are those comprising 10 to 90 percent of styrene and 90 to 10 percent of methyl methacrylate. The molecular weight thereof is from 2,000 to 200,000. Copolymers referred to above are not limited to only binary ones. They may further contain a small amount of copolymerizable unsaturated compound as the third component. The copolymerizable unsaturated compound may be, for example, α-methylstyrene, chlorostyrene, methylstyrene, dimethylstyrene, methacrylonitrile, methyl acrylate, ethyl acrylate, butyl methacrylate, vinyl acetate and the like.

The polymethyl methacrylates are vinyl polymers mainly consisting of methyl methacrylate. Its copolymers with 10 percent or less of copolymerizable vinyl compounds are also included therein. The molecular weight thereof is from 2,000 to 200,000. The copolymerizable vinyl compound may be, for example, styrene, methylstyrene, chlorostyrene, methyl acrylate, ethyl acrylate, butyl acrylate, butyl methacrylate or the like.

The aromatic polycarbonates signify polymers having the recurring unit of the formula;

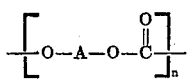

wherein A is a divalent aromatic residual group; $n$ is the degree of polymerization, which is an integer of from 10 to 1,000; and the divalent aromatic residual group is

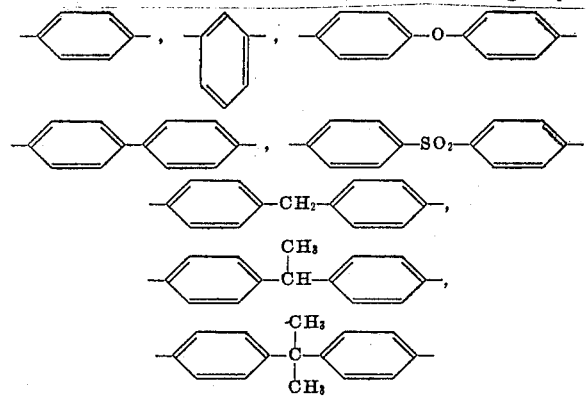

The mechanical and thermal properties of the composition of the present invention largely depends on the shape of the glass fiber used, and how the surface thereof has been treated. Length of glass fiber is preferably 0.2 mm or more and the diameter thereof is preferable from 5 to 50 micron. The surface treatment is effected with silanes such as vinylsilane, aminosilane, epoxysilane or the like or chromium compounds.

The composition of the present invention is prepared by any method. For instance, polymethyl methacrylate, for example, is blended in a dry state with a 1:1 resin mixture of polyphenylene ether and polystyrene to prepare the basic resin composition. The basic composition is melt and then kneaded together with glass fiber. Alternatively, the above mentioned polymers or resins may be melt-kneaded by means of an extruder, a heat roll, a Banbury mixer, a kneader, a blender or the like; or they may be homogeneously dissolved or mixed in the form of a solution or an emulsion and then the solvent may be removed, before the glass fiber is added. The manner how to add glass fiber to the resin composition is not critical. For instance, the addition is effected at a vent of an extruder or by a covering method.

An amount of the amorphous polymer resin is from 5 to 50 percent to from 95 to 50 percent of polyphenylene ether admixed with or without polystyrene, based on the basic resin composition. When the amount of addition of the amorphous polymer is too small, the elevation of Izod impact strength and the improvement of shaping processability are small. It is preferable to add at least 10 percent. It is not necessary to use one kind of the amorphous polymer. Two or more kinds of the amorphous polymers may also be used.

The effective amount of the glass fiber is from 10 to 50 parts, preferably 20 to 40 parts, to from 90 to 50 parts of the total amount of amorphous polymer resin and polyphenylene ether admixed with or without polystyrene, based on 100 parts of the sum of the glass fiber, amorphous polymer and polyphenylene admixed with or without polystyrene.

In the accompanying drawings, the changes of thermal deformation temperatures and Izod impact strength are shown when glass fiber is blended with polyphenylene ether compositions.

FIGS. 1 to 5 show the thermal deformation temperatures of the compositions prepared by adding the amorphous polymer resins mentioned below to polyphenylene ether or to a 60:40 resin mixtures of the polyphenylene ether and polystyrene, and further adding 20 percent (based on the thus obtained mixture) of glass fiber thereto.

Figure 2:
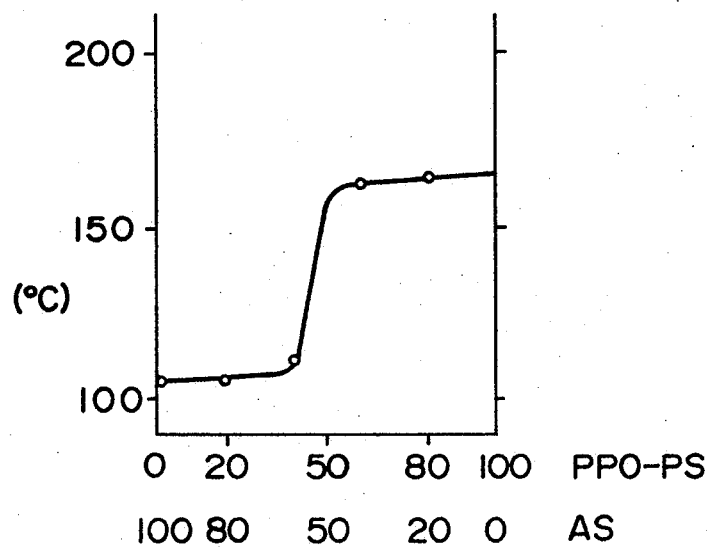
Figure 3:
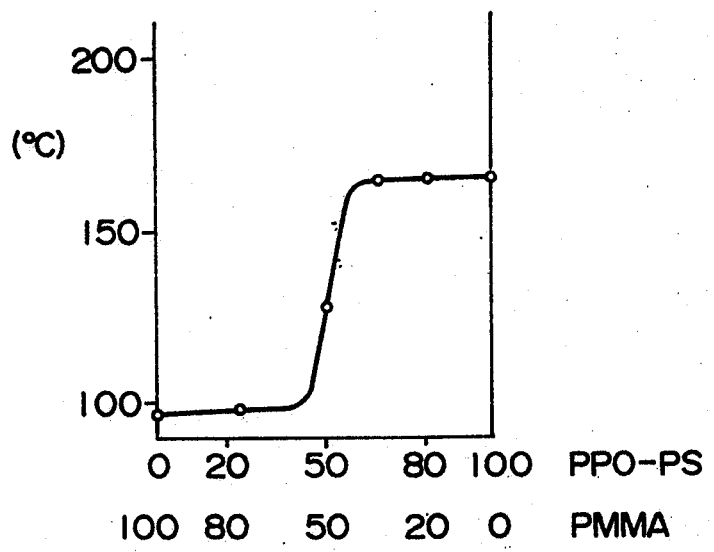
Figure 4:
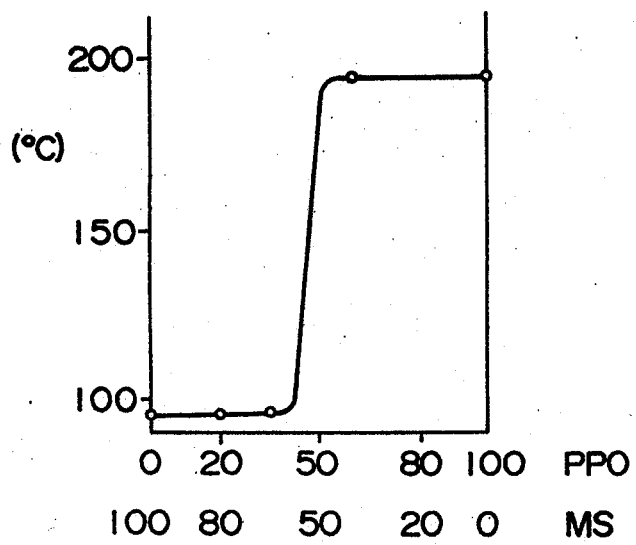
Figure 5:
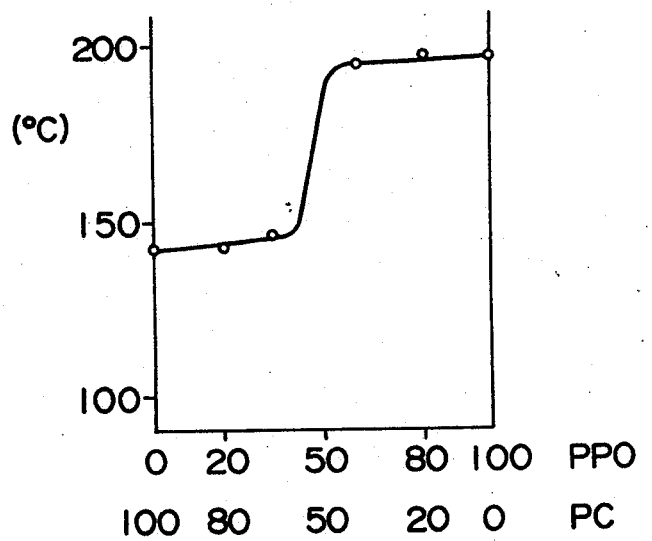

In FIGS. 1 and 2, a styrene-acrylonitrile copolymer resin containing 25 percent of acrylonitrile is used as the amorphous polymer resin; in FIG. 3, polymethyl methacrylate; in FIG. 4, a styrene-methyl methacrylate copolymer resin containing 45 percent of methyl methacrylate; and in FIG. 5, polycarbonate.

In the figures, abbreviations signify as follows:
PPO: polyphenylene ether
PS: polystyrene
AS: styrene-acrylonitrile copolymer
PMMA: polymethyl methacrylate
PC: polycarbonate
MS: styrene-methyl methacrylate copolymer The curves of the samples incorporated with 20 percent of glass fiber does not differ much from those of the respective samples having no glass fiber. Accordingly, the incorporation of glass fiber does not influence the thermal deformation temperatures.

Figure 6:
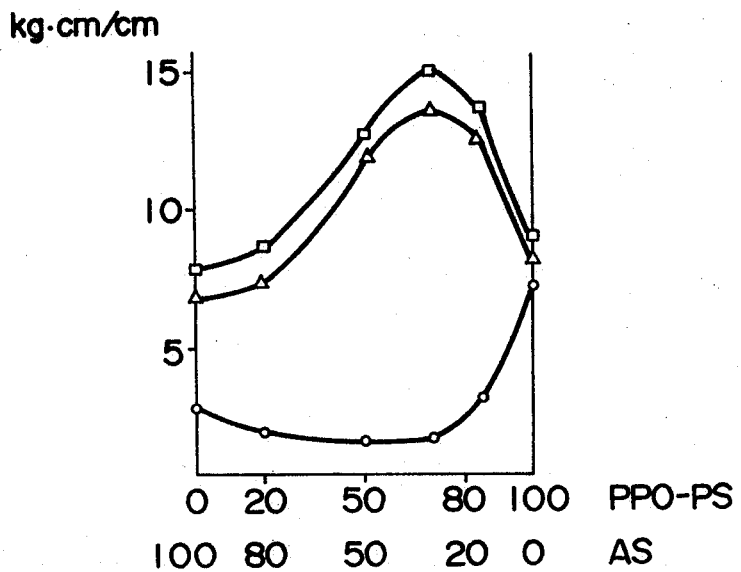

FIG. 6 teaches as follows: the mechanical property, particularly, Izod impact strength, is reduced extremely when a styrene-acrylonitrile copolymer (75:25) is mixed with a 60:40 resin mixture of polyphenylene ether and polystyrene. However, if 20 or 30 percent of glass fiber is added thereto, the curve tends to turn from concave to convex. That is, the Izod impact strength increases to large extents. Symbol □ signifies 30 percent glass fiber addition; Δ, 20 percent; and 0, 0 percent.

When a polystyrene resin is mixed with a polyphenylene ether, the shaping processability is large compared with polyphenylene ether alone.

For specific purposes, a coloring agent, a pigment, a plasticizer, a flaming retarding agent, a filler or the like may be added to the resin portion.

The present invention is further described in detail by the examples, although it is not intended to limit to those examples.

Example 1

80 Parts by weight (hereinafter parts are by weight) of poly(2,6-dimethylphenylene-1,4-ether) (the average polymerization degree: 320) was uniformly mixed with 20 parts of styrene-acrylonitrile copolymer (the average molecular weight: 160,000) containing 26 percent by weight (hereinafter percent is by weight) of acrylonitrile. The thus obtained mixture was melt-kneaded by an extruder equipped with a vent, having a cylinder temperature of 330°C. In this case, a glass fiber having 7 cm length and 10 micron diameter, which had been treated with vinylsilane, was added to the above-obtained resin mixture from the vent portion of the extruder in the proportion of 30 parts per 70 parts of the resin. Table 1 shows the injection shaping conditions and the physical properties of the shaped specimen of the glass fiber-reinforced resin composition obtained.

In addition, those of the glass fiber-reinforced polyphenylene ether excluding styrene-acrylonitrile copolymer, as the control, are shown therein.

TABLE 1

|  | Present invention | Control |
|---|---|---|
| Injection shaping Temperature (°C) | 310 | 360 |
| Injection shaping pressure (kg/cm²) | 1,200 | 1,450 |
| Izod impact value (kg.cm/cm) | 10.2 | 4.3 |
| Tensile strength (kg/cm²) | 1,250 | 1,400 |
| Bending strength (kg/cm²) | 1,950 | 1,950 |
| Thermal deformation temperature (°C) | 194 | 195 |

Example 2

70 Parts of a resin mixture of polyphenylene ether (the average polymerization degree: 240) and polystyrene (the average polymerization degree: 1,400), wherein the polystyrene content was 30 percent, was uniformly mixed with 30 parts of styrene-acrylonitrile copolymer (the average molecular weight: 140,000), wherein the acrylonitrile content is 25 percent. The thus obtained mixture was melt-kneaded by a vent-equipped extruder having a cylinder temperature of 280°C. The glass fiber used in Example 1 was added to the above-obtained resin mixture from the vent in the proportion of 30 parts per 70 parts of the resin to obtain a resin mixture. Table 2 shows the injection shaping conditions and the physical properties of the shaped specimen of the resin composition obtained. In addition, those of the composition excluding styrene-acrylonitrile copolymer, as the control, are shown therein.

TABLE 2

|  | Present Invention | Control |
|---|---|---|
| Injection shaping Temperature (°C) | 290 | 320 |
| Injection shaping pressure (kg/cm²) | 950 | 1,100 |
| Izod impact value (kg.cm/cm) | 11.4 | 5.3 |
| Tensile strength (kg/cm²) | 1,300 | 1,350 |
| Bending strength (kg/cm²) | 1,600 | 1,610 |
| Thermal deformation Temperature (°C) | 175 | 175 |

Examples 3 to 6

Example 1 was repeated to produce glass fiber-reinforced resin mixtures except that the proportions of a resin mixture (PPO + PS) of polyphenylene ether (the average polymerization degree: 240) and polystyrene (the average polymerization degree: 1,600), wherein the polystyrene content was 50 percent, to a styrene-acrylonitrile copolymer (AS) (the average molecular weight: 160,000), wherein the acrylonitrile (AN) content was 25 percent, were changed. The results are shown in Table 3.

TABLE 3

| Example No. | 3 | 4 | 5 | 6 |
|---|---|---|---|---|
| PPO + PS (1 : 1) | 55 | 70 | 80 | 90 |
| AS (25% AN) | 45 | 30 | 20 | 10 |
| Glass fiber (%) | 30 | 30 | 30 | 30 |
| Injection shaping temperature (°C) | 285 | 295 | 300 | 305 |
| Injection shaping pressure (kg/cm²) | 950 | 980 | 1,050 | 1,100 |
| Izod impact value (kg.cm/cm) | 12.4 | 14.4 | 12.7 | 10.5 |
| Tensile strength (kg/cm²) | 1,180 | 1,180 | 1,200 | 1,200 |
| Bending strength (kg/cm²) | 1,550 | 1,550 | 1,550 | 1,580 |
| Thermal deformation temperature (°C) | 149 | 150 | 151 | 151 |

Example 7

A glass fiber-reinforced resin comprising 20 parts of glass fiber and 80 parts of resin consisting of 60 parts of polyphenylene ether (the average polymerization degree: 240) and 40 parts of polymethyl methacrylate (the average polymerization degree: 1,200) was obtained by using the same apparatuses and conditions as those in Example 1. Table 4 shows the injection shaping conditions and the physical properties of the shaped specimen of the composition obtained.

TABLE 4

| Injection shaping temperature (°C) | 300 |
|---|---|
| Injection shaping pressure (kg/cm²) | 1,150 |
| Izod impact value (kg.cm/cm) | 9.6 |
| Tensile strength (kg/cm²) | 1,340 |
| Bending strength (kg/cm²) | 1,900 |
| Thermal deformation temperature (°C) | 194 |

Examples 8 and 9

70 Parts of a resin mixture (PPO + PS) of polyphenylene ether (the average polymerization degree: 320) and polystyrene (the average polymerization degree: 1,400), wherein the polystyrene content was 25 percent, was uniformly mixed with 30 parts of poly-carbonate resin (PC)(Jupilon N-1 produced by Mitsubishi Edogawa Kagaku Co., Ltd.), or with 30 parts of a styrene-methyl methacrylate copolymer (MS) (the average molecular weight: 180,000), wherein the methyl methacrylate content was 45 percent. The thus obtained mixture was melt-kneaded by a vent-equipped extruder having a cylinder temperature of 290°C. The glass fiber having 7 cm length and 10 micron diameter, which had been treated with a chromium complex compound, was added to the above-obtained resin mixture from the vent portion of the extruder in the proportion of 20 parts per 80 parts of the resin. Table 5 shows the injection shaping conditions and the physical properties of the glass fiber-reinforced resin compositions obtained. In addition, those excluding PC and MS are shown as the control.

TABLE 5

|  | Example 8 PC addition | Example 9 (MS addition) | Control (PPO+PS) |
| --- | --- | --- | --- |
| Injection shaping temperature (°C) | 295 | 290 | 310 |
| Injection shaping pressure (kg/cm²) | 1,010 | 980 | 1,100 |
| Izod impact value (kg.cm/cm) | 12.5 | 11.0 | 5.0 |
| Tensile strength (kg/cm²) | 1,350 | 1,300 | 1,350 |
| Thermal deformation temperature (°C) | 178 | 177 | 179 |

What we claim is:

1. A glass fiber-reinforced polyphenylene ether composition which comprises an admixture of (1) from 90 to 50 percent by weight of a basic resin and (2) from 10 to 50 percent by weight of glass fiber, said basic resin consisting of (a) from 50 to 95 percent by weight of polyphenylene ether alone or with up to 90 of styrene polymer which is a homopolymer or a styrene copolymer with a copolymerizable unsaturated compound, said copolymer containing at least 90 % of styrene and (b) from 50 to 5 percent by weight of the basic resin of an amorphous polymer of from 0.1 to 10 micron size, which provides at least two glass transition temperatures to the basic resin.

2. A composition according to claim 1, wherein the amount of glass fiber is from 20 to 40 percent by weight.

3. A composition according to claim 1, wherein the polyphenylene ether is poly(2,6-dimethylphenylene-1,4-ether).

4. A composition according to claim 1, wherein (a) is a mixture of 90 to 10 percent by weight of a polyphenylene ether and 10 to 90 percent by weight of styrenepolymer.

5. A composition according to claim 1, wherein the amorphous polymer is a styrene-acrylonitrile copolymer resin.

6. A composition according to claim 1 wherein the amorphous polymer is at least one resin selected from the group consisting of styrene-acrylonitrile copolymer containing 10 to 90 percent styrene, styrene-methyl methacrylate copolymer containing 10 to 90 percent styrene, methyl methacrylate polymer containing up to 10 percent of a copolymerizable vinyl compound, and an aromatic polycarbonate.

7. A composition according to claim 6 wherein the polyphenylene ether is poly(2,6-dimethylphenylene-1,4-ether) and the amorphous polymer is styrene-acrylonitrile.

8. A composition according to claim 6 wherein the polyphenylene ether is poly(2,6-dimethylphenylene-1,4-ether) and the amorphous polymer is polymethyl methacrylate.

9. A composition according to claim 6 wherein the polyphenylene ether is poly(2,6-dimethylphenylene-1,4-ether) and the amorphous polymer is aromatic polycarbonate.

10. A composition according to claim 6 wherein the polyphenylene ether is poly(2,6-dimethylphenylene-1,4-ether) and the amorphous polymer is styrene-methyl methacrylate copolymer.

11. A process for the production of a composition as claimed in claim 1 which comprises blending from 10–50 percent by weight of glass fiber and from 90 to 50 percent by weight of a resin composition, said resin composition having been prepared by dispersing from 50 to 5 percent by weight of an amorphous polymer of from 0.1 to 10 micron size in from 50 to 95 percent by weight of polyphenylene ether alone or with up to 90 percent of styrene polymer which is a homopolymer or styrene copolymer with a copolymerizable unsaturated compound, said copolymer containing at least 90 percent of styrene.

12. A process according to claim 11 wherein the polyphenylene ether is poly (2,6-dimethylphenylene-1,4-ether) and the amorphous polymer is styrene-acrylonitrile.

13. A process according to claim 11 wherein the polyphenylene ether is poly (2,6-dimethylphenylene-1,4-ether) and the amorphous polymer is polymethyl methacrylate.

14. A process according to claim 11 wherein the polyphenylene ether is poly (2,6-dimethylphenylene-1,4-ether) and the amorphous polymer is aromatic polycarbonate.

15. A process according to claim 11 wherein the polyphenylene ether is poly (2,6-dimethylphenylene-1,4-ether) and the amorphous polymer is styrene-methyl methacrylate copolymer.

* * * * *